United States Patent
Tada et al.

(10) Patent No.: US 6,654,317 B2
(45) Date of Patent: Nov. 25, 2003

(54) METHOD AND APPARATUS FOR REPRODUCING INFORMATION

(75) Inventors: Atsuki Tada, Tokorozawa (JP); Takao Yamada, Tokorozawa (JP); Takashi Suzuki, Tokorozawa (JP); Takeaki Funada, Tokorozawa (JP); Yuuji Murai, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/151,958

(22) Filed: May 22, 2002

(65) Prior Publication Data

US 2002/0196714 A1 Dec. 26, 2002

(30) Foreign Application Priority Data

Jun. 26, 2001 (JP) ........................................ 2001-193120

(51) Int. Cl.⁷ ............................. G11B 21/08; G11B 7/00
(52) U.S. Cl. ............................ 369/30.12; 369/124.06; 369/275.3
(58) Field of Search ..................... 369/30.12, 30.04, 369/275.3, 53.24, 47.13, 59.14, 47.1, 53.12, 116, 53.37, 124.06, 30.17; 386/95, 106, 96, 111, 116

(56) References Cited

U.S. PATENT DOCUMENTS

| | | | |
|---|---|---|---|
| 5,224,087 A | * 6/1993 | Maeda et al. | 369/53.12 |
| 5,343,456 A | * 8/1994 | Maeda | 369/47.33 |
| 5,519,681 A | * 5/1996 | Maeda et al. | 369/47.16 |
| 5,592,450 A | * 1/1997 | Yonemitsu et al. | 386/96 |
| 5,596,565 A | * 1/1997 | Yonemitsu et al. | 369/275.3 |
| RE37,327 E | * 8/2001 | Yonemitsu et al. | 386/96 |
| 6,320,825 B1 | * 11/2001 | Bruekers et al. | 369/30.17 |

* cited by examiner

*Primary Examiner*—Ali Neyzari
(74) *Attorney, Agent, or Firm*—Young & Thompson

(57) ABSTRACT

A method for reproducing information, comprising the steps of: reading compressed audio data from an information recording medium in which the compressed audio data is recorded in a frame unit; and subjecting the compressed audio data thus read to an expansion processing to reproduce same. When an instruction is given to make a special reproduction in which a frame region to be reproduced and an other frame region not to be reproduced are mixed, control is made so that the compressed audio data in respective frames are successively reproduced in the frame region to be reproduced, and a header information for the respective frames is read out in the other frame region not to be reproduced, and determination on a leading position of a subsequent frame is made on a basis of the header information, thereby conducting a successive migration for the respective frames.

6 Claims, 4 Drawing Sheets

METHOD AND APPARATUS FOR REPRODUCING INFORMATION

BACKGROUND OF THE INVENTION

1. Field of the Invention

The present invention relates to a method and apparatus for reproducing information, which read compressed audio data from an information recording medium in which the compressed audio data is recorded in a frame unit and subjects the compressed audio data thus read to an expansion processing to reproduce same, and more particularly to such a method and apparatus having a function of a fast forwarding reproduction in which frame regions to be reproduced and the other frame regions not to be reproduced are repeated alternately.

2. Description of the Related Art

There has recently been popularized a compression system in which a musical audio data is subjected to a compression processing to generate a compressed audio data and the compressed audio data is subjected to an expansion processing to reconstitute the original audio data. As such a compression system, the MP3 (MPEG Audio Layer-3) format is known for example. The MP3 format is excellent in that a data size can remarkably be reduced in comparison with the original audio data.

An information reproducing apparatus to which the above-described compression system is applied, has a function of reading out the compressed audio data, which has been recorded in an information recording medium such as a CD or a flash memory. In general, the compressed audio data has a data structure with divided frames so that each of the frames includes a header information and a main body as the compressed audio data. When a normal reproduction is carried out with the use of the information reproducing apparatus, the frames are read out successively to make reproduction in a reading-out order. It is preferable that the information reproducing apparatus can perform not only the normal reproduction, but also a special reproduction. A fast forwarding reproduction is a typical example of the special reproduction. A user can conduct the fast forwarding reproduction is carried out when listening to music, thus making it possible to recognize the position of music being reproduced so as to provide useful effects. In order to achieve such a fast forwarding reproduction, there is required control of repeating a skipping operation of a plurality of frames after reproduction of the frames in the information reproducing apparatus.

With respect to the above-mentioned compression system, there exist a constant bit rate system in which the same bit rate is set for the respective frames and a variable bit rate system in which different bit rates are set for the respective frames. When the above-mentioned fast forwarding reproduction is performed, the constant bit rate system in which relationship between time and a data size becomes linear so that the frame size of each of the frames becomes constant, makes it possible to determine previously a position of the subsequent frame to make easily control of skipping a plurality of frames. On the other hand, the variable bit rate system in which the frame size varies, requires measures to determine the position of the subsequent frame with the use of a suitable method. With respect to an ordinary method, it is conceivable that a positional information such as an address for the respective frames is previously obtained and the thus obtained information is stored as a map in a memory so that the above-mentioned fast forwarding reproduction is carried out with reference to the map.

Previous preparation of the map for the entirety of the information recording medium in which the compressed audio data has been recorded, requires much time. It is also necessary to ensure the memory having a sufficient storing capacity in order to preserve the map. Accordingly, increase in processing load and a required capacity of a memory becomes a problem, in order to perform the fast forwarding reproduction based on the compression system of the variable bit rate system.

SUMMARY OF THE INVENTION

An object of the present invention, which was made to solve the above-described problems, is therefore to provide a method and apparatus for reproducing information, which permits to relieve increase in processing load and a required capacity of a memory so that the compressed audio data is read out from the information recording medium to make a special reproduction such as a fast forwarding reproduction.

In order to attain the aforementioned object, the method of the present invention for reproducing information, comprises the steps of:

reading compressed audio data from an information recording medium in which the compressed audio data is recorded in a frame unit; and subjecting the compressed audio data thus read to an expansion processing to reproduce same, wherein:

when an instruction is given to make a special reproduction in which a frame region to be reproduced and an other frame region not to be reproduced are mixed, control is made so that the compressed audio data in respective frames are successively reproduced in the frame region to be reproduced, and a header information for the respective frames is read out in the other frame region not to be reproduced, and determination on a leading position of a subsequent frame is made on a basis of the header information, thereby conducting a successive migration for the respective frames.

The apparatus of the present invention for reproducing information, which reads compressed audio data from an information recording medium in which the compressed audio data is recorded in a frame unit and subjects the compressed audio data thus read to an expansion processing to reproduce same, the apparatus comprises:

an instruction device for giving instruction to make a special reproduction in which a frame region to be reproduced and an other frame region not to be reproduced are mixed; and a reproduction control device for making control so that the compressed audio data in respective frames are successively reproduced in the frame region to be reproduced, and a header information for the respective frames is read out in the other frame region not to be reproduced, and determination on a leading position of a subsequent frame is made on a basis of the header information, thereby conducting a successive migration for the respective frames, when the special reproduction is instructed.

According to the above-mentioned method and apparatus of the present invention, when the special reproduction such as the fast forwarding reproduction is instructed during reproduction of the compressed audio data, control is made so that the frame region to be reproduced normally and the other frame region to be skipped without being reproduced are repeated. In this case, control is made to repeat the steps of reading out a header information for the respective frames to analyze same and determining a leading position of the subsequent frame, when conducting a successive migration for the respective frames in the frame region not to be reproduced. In case where the skipping operation of the frame is required upon making a special reproduction in a state that the arrangement of the frames cannot be determined previously, it is possible to determine surely the leading position of the respective frame without previously preparing the map, thus reducing the processing load and the capacity of the memory.

In the above-mentioned method and apparatus of the present invention, the special reproduction may comprise a fast forwarding reproduction in which the frame regions to be reproduced that comprise continuous frames having a number of "S" and the other frame regions not to be reproduced that comprise continuous frames having a number of "M" are repeated alternately. According to such a feature of the present invention, control is made for the compressed audio data with divided frames so that the frames having the number of "S" are continuously reproduced in the frame region to be reproduced, on the one hand, and the frames having the number of "M" are continuously skipped in the frame region not to be reproduced. Accordingly, it is possible to carry out the fast forwarding operation in which reproduction and a search alternate after a certain interval of time. In addition to such an effect, a user can easily recognize the position of the music being reproduced.

In the above-mentioned method and apparatus of the present invention, the compressed audio data may be generated based on a variable bit rate system in which different bit rates are set for the respective frames. According to such a feature, the variable bit rate system, which is applied as the compression system to generate the compressed audio data, makes it possible to determine the leading position of the frame to conduct an easy skipping operation without previously preparing any map, while the respective frames have the different frame size from each other.

DETAILED DESCRIPTION OF THE PREFERRED EMBODIMENTS

Now, embodiments of the present invention will be described in detail below with reference to the accompanying drawings.

Figure 1:
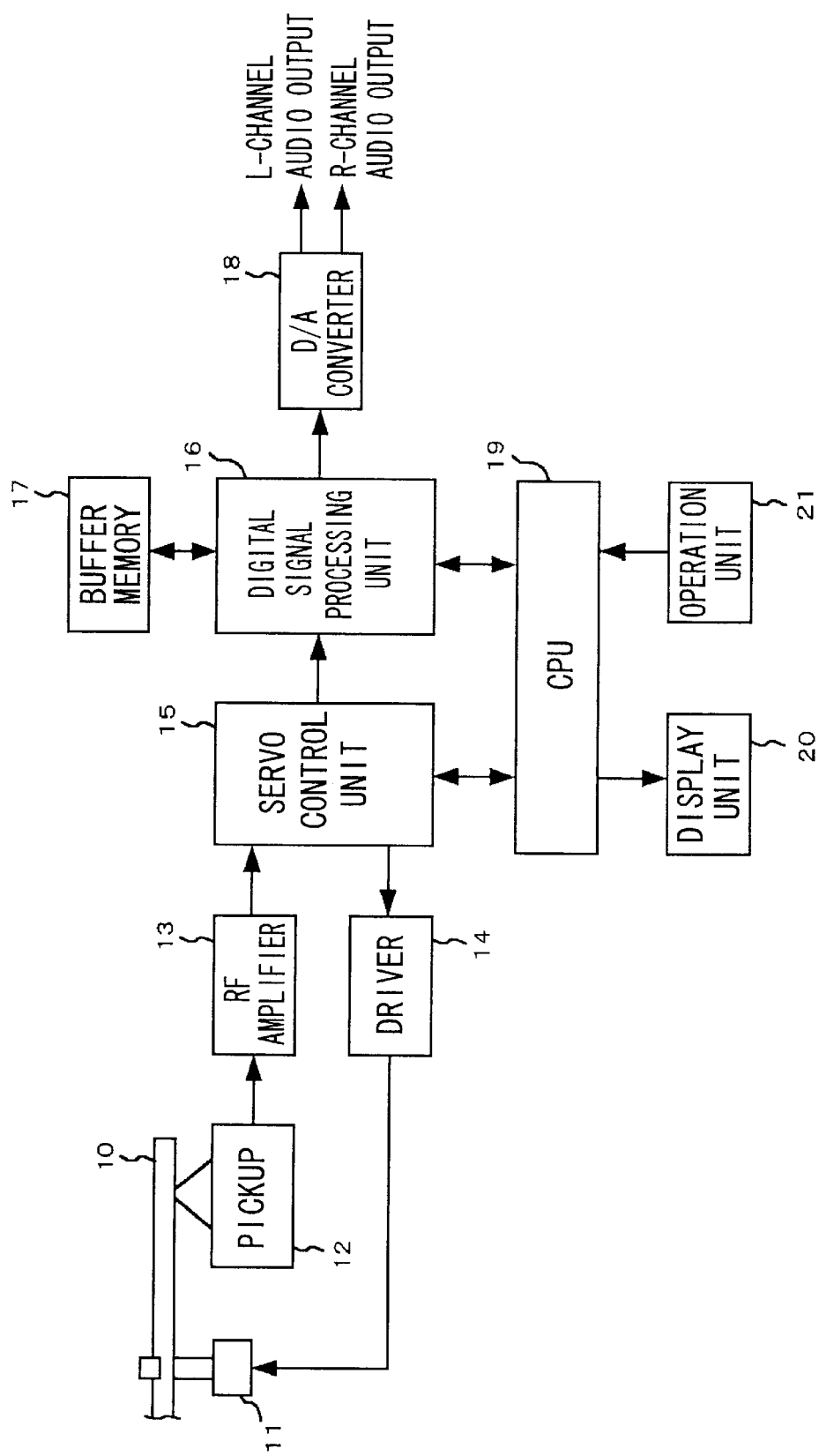
FIG. 1 is a block diagram illustrating the entire structure of a disc player serving as an information reproducing apparatus of the embodiment of the present invention.

FIG. 1 is a block diagram illustrating the entire structure of a disc player serving as an information reproducing apparatus of the embodiment of the present invention. The disc player as shown in FIG. 1 is composed of a spindle motor 11, a pickup 12, an RF amplifier 13, a driver 14, a servo control unit 15, a digital signal processing unit 16, a buffer memory 17, a D/A converter 18, a CPU 19, a display unit 20 and an operation unit 21, in order to read out a compressed audio data recorded in a disc 10 loaded in the disc player to reproduce same.

A CD serving as an information recording medium used exclusively for reproduction is used for example as the disc 10. A writable information recording medium may be used. A compressed audio data, which is generated by compressing the original audio data, is recorded in the disc 10. An MP3 format is for example applied as a compression format to generate the compressed audio data. The other information recording medium than the CD, and the other compression format than the MP3 may be applied in the present invention.

Figure 2:
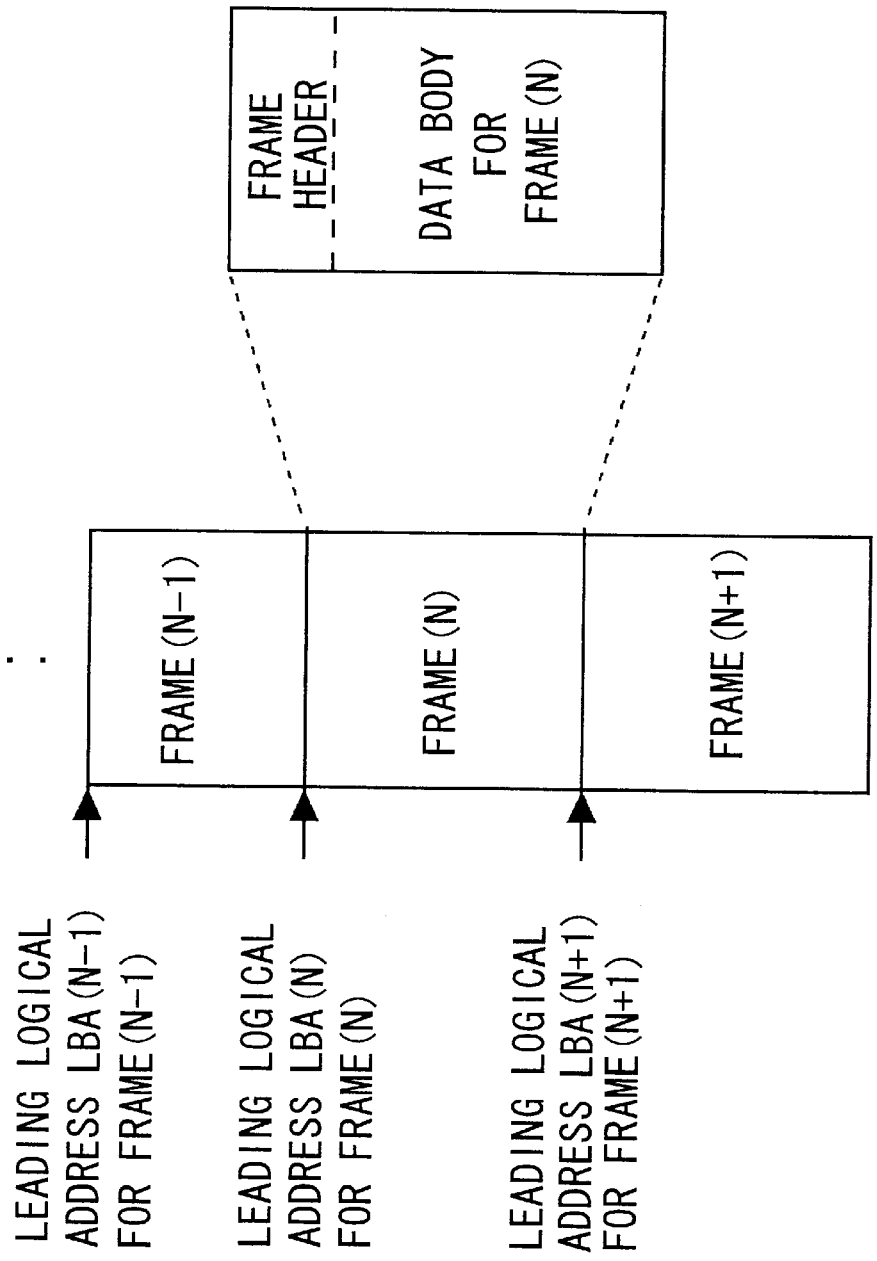
FIG. 2 is a view illustrating a disc used in the embodiment of the present invention.

FIG. 2 is a view illustrating the data structure of the disc 10. In the embodiment of the present invention, the compressed audio data is stored in a file. The single compressed audio file is allocated for the single piece of music. The respective compressed audio file is divided into a plurality of frames. An example as shown in FIG. 2 illustrates the frame (N−1) starting from a leading logical address LBA(N−1), the frame (N) starting from a leading logical address LBA(N) and the frame (N+1) starting from a leading logical address LBA(N+1). The prescribed numbers of frames are arranged in the prescribed order in the compressed audio file. Each of the frames has a data structure, which is composed of a frame header and a data body. Various kinds of information for the frame, such as a bit rate, a sampling rate and a padding flag described later, are recorded as a header information in the frame header. The compressed audio data for a prescribed period of time in the single piece of music is allocated in the data body of the frame.

The embodiment of the present invention stands on the assumption that the compression format based on the variable bit rate system such as the MP3 format as described above. The variable bit rate system in which the different bit rates are set for the respective frames, provides advantageous effects in reproduction quality relative to the same data size, thus performing an effective compression, in comparison with the constant bit rate system in which the same bit rate is set for the respective frames. The constant bit rate system has a constant relationship between time and a data size. On the contrary, the variable bit rate system has no proportional relationship between time and a data size. When skipping the frames (N−1) to (N+1) as shown in FIG. 2 during a fast forwarding reproduction processing in the disc player, the leading logical addresses LBA(N−1) to LBA(N+1) cannot be determined uniformly, thus requiring recognition of an amount of data in the respective frames in accordance with the measures described below.

Referring to FIG. 1, a laser beam is irradiated onto the disc 10, which is loaded into the disc player, by means of the pickup 10, while the disc 10 is rotated at the prescribed rotational speed by the spindle motor 11. The pickup 12 generates an RF signal corresponding to the compressed audio data on the basis of reflected light from the optical disc 10. The RF signal outputted from the pickup 12 is amplified at the prescribed gain by means of the RF amplifier 13 and then inputted through the servo control unit 15 into the digital signal processing unit 16. The servo control unit 15 makes a servo control of the spindle motor 11 through the driver 14 under control of the CPU 19 and controls a tracking servo and a focus servo relative to the pickup 12 on the basis of the RF signal.

The digital signal processing unit 16 extracts the compressed audio file corresponding to the RF signal and subjects the respective frames to various kinds of digital signal processing. The digital signal processing unit 16 subjects the compressed audio file to an expansion processing as the processing corresponding to the above-described compression format and reconstitutes the original audio data to output same. The buffer memory 17, which is connected to the digital signal processing unit 16, is a storing device to carry out, at the prescribed timing, reading and writing for the prescribed number of frames of the compressed audio file to be processed by means of the digital signal processing unit 16 and to provide a temporary storing effect.

The D/A converter 18 converts the audio data, which is inputted from the digital signal processing unit 16, into an analog signal and generates an L-channel audio output and an R-channel audio output in correspondence to a stereo audio to output them.

The CPU 19 controls the entire operation of the disc player as shown in FIG. 1. The CPU 19 sends control signals to the servo control unit 15 and the digital signal processing unit 16 to control execution of the normal reproduction processing as well as execution of the fast forwarding reproduction processing as the special reproduction in a manner described later. The display unit 20 for displaying the prescribed information and the operation unit 21 having keys, through which a user gives his or her instructions for the disc player, are connected to the CPU 19.

Now, description will be given below of the fast forwarding reproduction processing, which is conducted by means of the disc player of the embodiment of the present invention with reference to FIGS. 3 and 4. Here, there is described the fast forwarding reproduction processing, which is conducted when reproduction and search of the disc 10 are repeated intermittently after a certain interval of time in order to search a piece of music, which exists in a certain position of the disc 10. More specifically, the operation of skipping the continuous frames having the number of "M" and then reproducing the continuous frames having the number of "S" in a normal manner is repeated to carry out the fast forwarding reproduction. The above-mentioned continuous frames having the number of "M" correspond to the frame region not to be reproduced and the above-mentioned continuous frames having the number of "S" correspond to the frame region to be reproduced.

Figure 3:
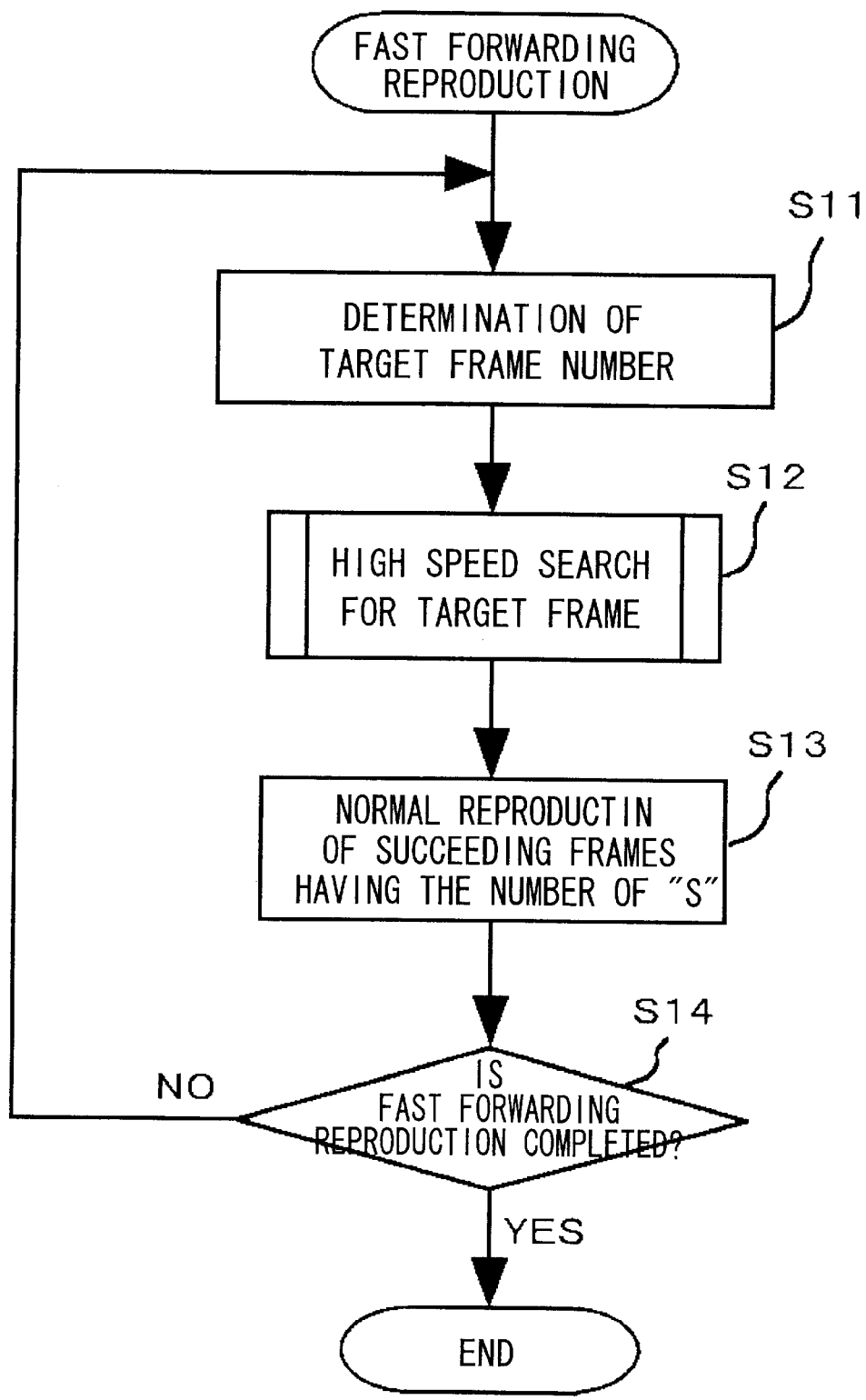
FIG. 3 is a flowchart illustrating the entirety of a fast forwarding reproduction processing in the disc player.

FIG. 3 is a flowchart illustrating the entirety of the above-mentioned fast forwarding reproduction processing. For example, the prescribed key operation, which is carried out by a user during reproduction of the disc 10, starts the processing as shown in FIG. 3. As shown in FIG. 3, when a target frame, which exists in a leading position of the frames having the number of "S" to be reproduced is to be searched, a target frame number is determined (Step S11). More specifically, the target frame number may be determined by adding the number "M" of the frames to be skipped to the current frame number to be reproduced normally. In the compression system such as the MP3 format, the frame number is not recorded in the frame header as shown in FIG. 2. Accordingly, it is necessary for the CPU 19 to count the frame number to make a constant management.

Then, a high speed search for the above-mentioned target frame is conducted (Step S12). As a result, the frames having the number of "M" preceding the target frame are skipped. FIG. 4 is a flowchart illustrating specific processing for the high speed search for the target frame in the Step S12.

Figure 4:
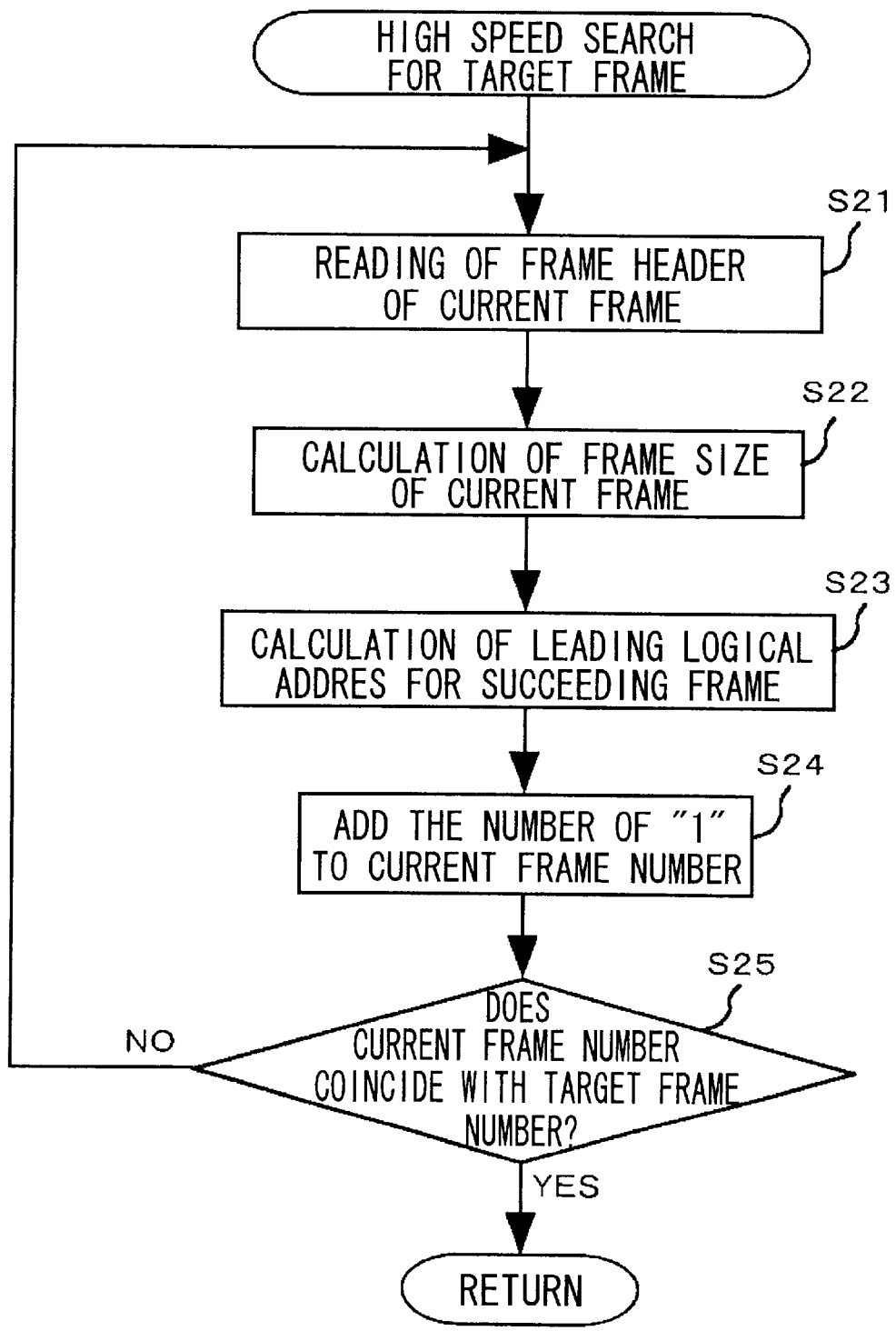
FIG. 4 is a flowchart illustrating specific processing for a high speed search for a target frame in the Step S12 as shown in FIG. 3.

In FIG. 4, at the time when the high speed search for the target frame starts, the current frame number is obtained and the leading logical address LBA(C) for the current frame is recognized as mentioned above. On condition that the variable bit rate system is applied and any address map is not prepared, the leading logical address LBA(T) for the target frame cannot be recognized at this stage. The following processing is therefore executed.

As shown in FIG. 4, the frame header of the current frame is read out (Step S21). The contents of the frame header as read out are analyzed to calculate the frame size of the current frame (Step S22). More specifically, it is possible to obtain the frame size of the current frame from the data size of the frame header itself and the data size of the data body, which is obtained on the basis of the bit rate, a sampling rate and a padding flag, which are recorded as the header information in the frame header.

Then, there is obtained the leading logical address for the succeeding frame, which is adjacent to the current frame (Step S23). More specifically, the leading logical address may be obtained by adding the frame size of the current frame, which is calculated in Step S22, to the leading logical address LBA(C) for the current frame as already obtained. The leading logical address LBA(C) is updated with the value obtained in Step S23 so that the updated leading logical address can be utilized in the subsequent processing.

Then, the number of "1" is added to the current frame number to advance the search by one frame (Step S24). Comparison between the new current frame number and the target frame number is made to judge as whether they correspond to each other (Step S25). When the current frame number and the target frame number do not correspond to each other (NO in Step S25), the control is returned to Step S21 to repeat the same processing for any one of the frames having the number of "M" to be skipped. As a result, a migration processing from the current frame to the succeeding frame can be conducted. When the current frame number and the target frame number correspond to each other (YES in Step S25), it is judged that the frames having the number of "M" are skipped at this stage, the processing as shown in FIG. 4 ends. The leading logical address LBA(T) for the target frame is set as the leading logical address LBA(C) for the current frame at this stage.

Then, after Step S12 as shown in the flowchart in FIG. 4, the normal reproducing operation is carried out for the succeeding frames having the number of "S" starting from the basis point of the target frame, as shown in FIG. 3 (Step S13). When reproduction of the frames having the number of "S" is completed, it is judged as whether or not the fast forwarding reproduction as being executed is ended (Step S14). Such a step is carried out when a user operates the keys on the operation unit 21 in an appropriate manner to instruct the fast forwarding reproduction to be ended.

When the fast forwarding reproduction is to be ended resulting from judgment in Step S14 (YES in Step S14), the fast forwarding reproduction as shown in FIGS. 3 and 4 ends. When the fast forwarding reproduction is to be continued (NO in Step S14), the control is returned to Step S11 to repeat the same processing. The skipping operation of the continuous frames having the number of "M" and the normal reproducing operation of the continuous frames having the number of "S" alternate in this manner during repeated execution of the processing of Step S11 to Step S14. When the frames having the number of "M" is skipped, the reading operation of the frame header may merely be carried out. It is therefore possible to execute the processing for a very short period of time in comparison with the required period of time for the normal reproduction of the frames having the number of "S". As a result, the fast forwarding can be performed, while outputting reproduction sound at a high speed, thus making it possible for a user to recognize easily the reproduction starting position as desired.

The fast forwarding reproduction processing is carried out in a manner as described with reference to FIGS. 3 and 4, thus relieving a need for preparation of a map to recognize previously the frame arrangement. More specifically, in the variable bit rate system in which the frame size is not constant, it is effective to read out previously the frame header of the respective frames of the compressed audio file to store the map in which the leading logical addresses are successively recorded, in order to determine the position of frame to be skipped when conducting the special reproduction. When an amount of data becomes large, preparation of the map however requires much time, thus deteriorating the rapid processing. Increase in an amount of data lead to a need for ensuring a sufficient capacity of the memory in which the map is to be stored, thus increasing cost. According to the embodiment of the present invention, preparation of the map is not needed even when the fast forwarding reproduction to which the variable bit rate system is applied, is carried out, thus permitting a rapid start of the processing and reducing the capacity of the memory.

The embodiment of the present invention describes the fast forwarding reproduction serving as one example of the special reproduction utilizing the disc player. The present invention is not limited only to such a fast forwarding reproduction. The present invention may be applied to many cases where there is carried out the special reproduction in which the frame region to be reproduced and the other frame region not to be reproduced are mixed.

According to the present invention as described in detail, when the compressed audio data is read out from the information recording medium to carry out the special reproduction such as the fast forwarding reproduction, it is possible to recognize the leading position of the succeeding frame on the basis of the header information of the respective frame in the frame region not to be reproduced. Accordingly, there can be provided the method and apparatus for reproducing information, which permits to relieve increase in processing load and a required capacity of a memory.

The entire disclosure of Japanese Patent Application No. 2001-193120 filed on Jun. 26, 2001 including the specification, claims, drawings and summary is incorporated herein by reference in its entirety.

What is claimed is:

1. A method for reproducing information, comprising the steps of:

reading compressed audio data from an information recording medium in which the compressed audio data is recorded in a frame unit; and subjecting the compressed audio data thus read to an expansion processing to reproduce same, wherein:

when an instruction is given to make a special reproduction in which a frame region to be reproduced and an other frame region not to be reproduced are mixed, control is made so that the compressed audio data in respective frames are successively reproduced in the frame region to be reproduced, and a header information for the respective frames is read out in the other frame region not to be reproduced, and determination on a leading position of a subsequent frame is made on a basis of the header information, thereby conducting a successive migration for the respective frames.

2. The method as claimed in claim 1, wherein:

the special reproduction comprises a fast forwarding reproduction in which the frame regions to be reproduced that comprise continuous frames having a number of "S" and the other frame regions not to be reproduced that comprise continuous frames having a number of "M" are repeated alternately.

3. The method as claimed in claim 1, wherein:

the compressed audio data is generated based on a variable bit rate system in which different bit rates are set for the respective frames.

4. An apparatus for reproducing information, which reads compressed audio data from an information recording medium in which the compressed audio data is recorded in a frame unit and subjects the compressed audio data thus read to an expansion processing to reproduce same, the apparatus comprising:

an instruction device for giving instruction to make a special reproduction in which a frame region to be reproduced and an other frame region not to be reproduced are mixed; and a reproduction control device for making control so that the compressed audio data in respective frames are successively reproduced in the frame region to be reproduced, and a header information for the respective frames is read out in the other frame region not to be reproduced, and determination on a leading position of a subsequent frame is made on a basis of the header information, thereby conducting a successive migration for the respective frames, when the special reproduction is instructed.

5. The apparatus as claimed in claim 4, wherein:

the special reproduction comprises a fast forwarding reproduction in which the frame regions to be reproduced that comprise continuous frames having a number of "S" and the other frame regions not to be reproduced that comprise continuous frames having a number of "M" are repeated alternately.

6. The apparatus as claimed in claim 4, wherein:

the compressed audio data is generated based on a variable bit rate system in which different bit rates are set for the respective frames.

* * * * *